United States Patent [19]

Tsay

[11] Patent Number: 5,031,520
[45] Date of Patent: Jul. 16, 1991

[54] CUTTING AND FORMING DEVICE FOR AN APPARATUS FOR MAKING BUNS

[76] Inventor: Shih C. Tsay, No. 62, Line 313, Wen Hsien Rd., Tainan, Taiwan

[21] Appl. No.: 580,574

[22] Filed: Sep. 11, 1990

[51] Int. Cl.[5] .................. A23P 1/00; A21C 11/10
[52] U.S. Cl. ...................... 99/353; 99/450.1; 99/537; 425/133.1; 425/297; 425/299; 425/307
[58] Field of Search .................. 99/353–355, 99/450.1, 450.2, 537, 538, 541; 30/114, 176, 178, 183, 287, 294, 302, 303; 425/131.1, 133.1, 297–299, 306–308

[56] References Cited

U.S. PATENT DOCUMENTS

| | | | |
|---|---|---|---|
| 3,190,330 | 6/1965 | Hawkins | 99/537 |
| 3,430,290 | 3/1969 | Kinslow, Jr. | 425/307 |
| 3,520,010 | 7/1970 | Dockery | 425/307 |
| 3,572,259 | 3/1971 | Hayashi | 425/307 |
| 4,334,464 | 6/1982 | Shinriki | 99/450.2 |
| 4,336,010 | 6/1982 | Thompson | 425/298 |
| 4,398,881 | 8/1983 | Kobayashi | 425/297 |
| 4,597,731 | 7/1986 | Suzuki | 425/297 |
| 4,636,158 | 1/1987 | Huang | 425/133.1 |
| 4,936,203 | 6/1990 | Aoki et al. | 99/450.1 |

Primary Examiner—Timothy F. Simone
Attorney, Agent, or Firm—Fleit, Jacobson, Cohn, Price, Holman & Stern

[57] ABSTRACT

A cutting and forming device for an apparatus for making buns has a base plate, a rotary annular disc and of die pieces combined under the rotary annular disc and on the base plate such that they can be moved by an operating mechanism, to have their front cutting tips gather closely together or retract thus cutting and forming dough into buns.

2 Claims, 3 Drawing Sheets

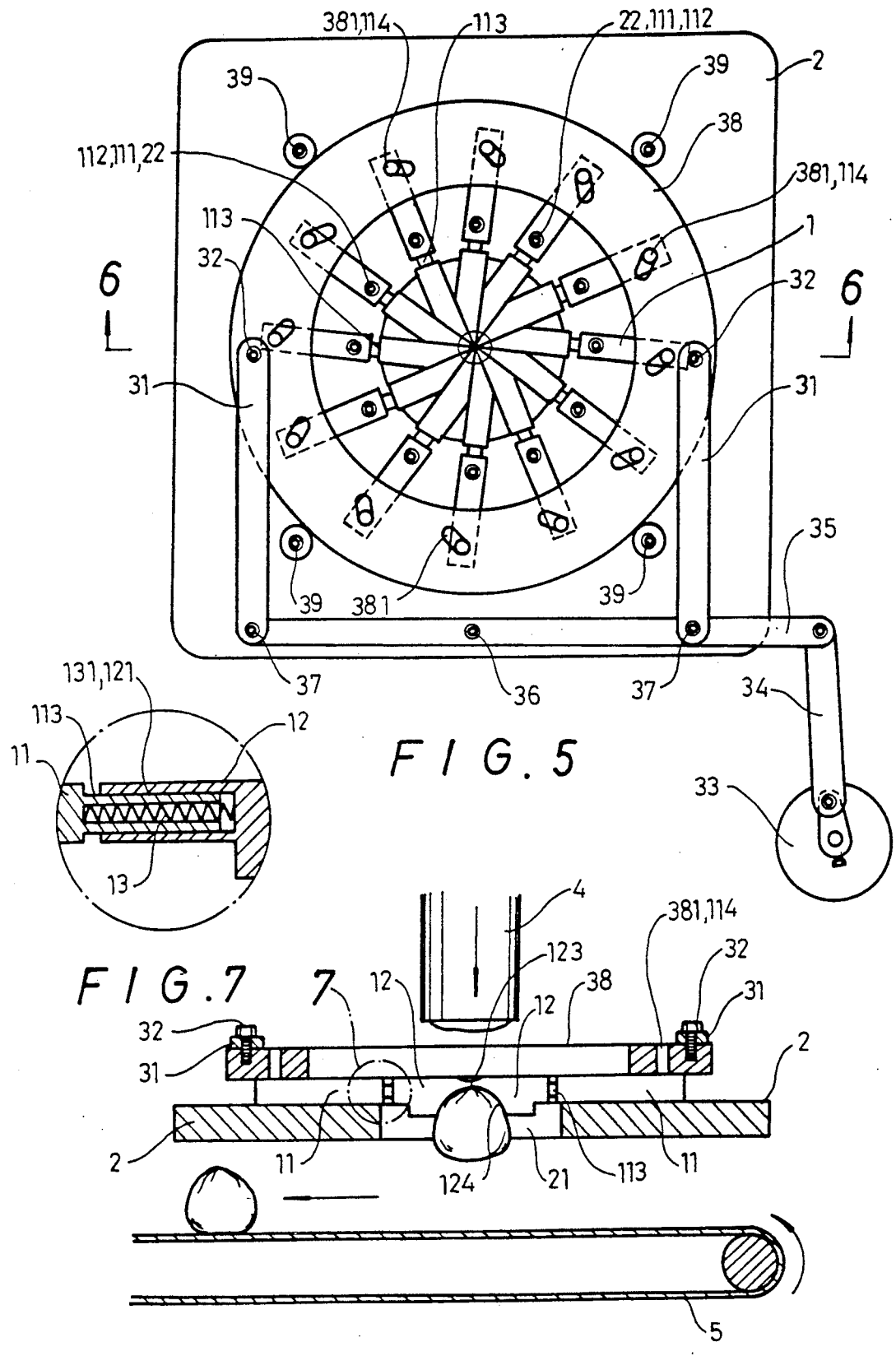

CUTTING AND FORMING DEVICE FOR AN APPARATUS FOR MAKING BUNS

BACKGROUND OF THE INVENTION

The apparatus for making buns described in U.S. Letter Pat. No. 4,636,158 comprises a meat feeding unit, a dough feeding unit and a bun forming unit, wherein a dough is continuously processed to become a bun. During the process the dough may lose its viscosity because of the heat produced and thus finished buns may lose their delicious taste. In addition, the circular plate and the die pieces may have problems in their interrelation as to make the die pieces close together, such as the correctness of the angle of each die piece, the exactness of the distance from the pointed tip of the die piece to the fixing post. Each die piece has to have a recess opening at its bottom side to receive a bearing and a spring to urge the bearing and the front edge of the recess opening. But if the elasticity of the spring is not proper, all the die pieces can not be pushed to close together for cutting the dough. So the structure of the die piece and related components are rather complicated, and inconvenient to manufacture.

SUMMARY OF THE INVENTION

An object of the present invention is to provide a cutting and forming device with simple structure for an apparatus for making buns.

The cutting and forming device for an apparatus for making buns in the present invention comprises a number of die pieces, a base plate, a rotary annular disc and an operating mechanism.

Each die piece has an outer portion and an inner portion combined together. The outer portion has a square section and a tubular section of smaller size than the square section and extending inward length-wise from the square section. The square section has at the inner end a screw hole for a screw to pass through for fixing it on the base plate and a protruding upright post at the outer end to fit movably in an elongate hole in the rotary annular disc. The tubular section fits in a lengthwise hole in the inner portion and contains a coiled spring having one end urging the end face of the square section and the other end urging a bottom face of the lengthwise hole in the inner portion. Thus, the inner portion is always pushed resiliently forward by the spring when each die piece is combined together and fixed on the base plate.

The base plate is provided with a central opening for dough to pass through and a number of screw holes arranged concentrically around the central opening for screwing all the die pieces radially on its lateral surface. All die pieces can move rotatingly with the screws as the pivots.

The rotary annular disc is provided with a number of elongate holes equally spaced apart radially a little far from and around the central opening and having the same distance to the center of the rotary annular disc. The rotary annular disc is to be placed laterally on all of the die pieces screwed on the base plate, with its elongate holes being fitted in by the protruding posts of the die pieces, and so the die pieces are sandwiched between the base plate and the rotary annular disc if viewed cross-sectionally.

The operating mechanism comprises a fly wheel eccentrically combined with a connecting rod and then with a push rod, which is connected at both ends with two push arms having their one end connected with the rotary annular disc. When the fly wheel is continually rotated, the rotary annular disc can be rotated reciprocatingly in a limited angle clockwise or counterclockwise and all of the die pieces can be moved radially from a released position to a cutting and forming position or vice versa continually by the movement of the rotary annular disc. Therefore, dough coming down through the central opening of the base plate can be continually cut and formed into buns by the movement of the die pieces.

BRIEF DESCRIPTION OF THE DRAWINGS

FIG. 5 is a bottom view of the die pieces in a cutting and forming position.

FIG. 6 is a cross-sectional view taken along line 6—6 of FIG. 5.

FIG. 7 is a magnified view of the part marked 7 on FIG. 6.

DETAILED DESCRIPTION OF THE PREFERRED EMBODIMENT

Figures 2, 3, 4:
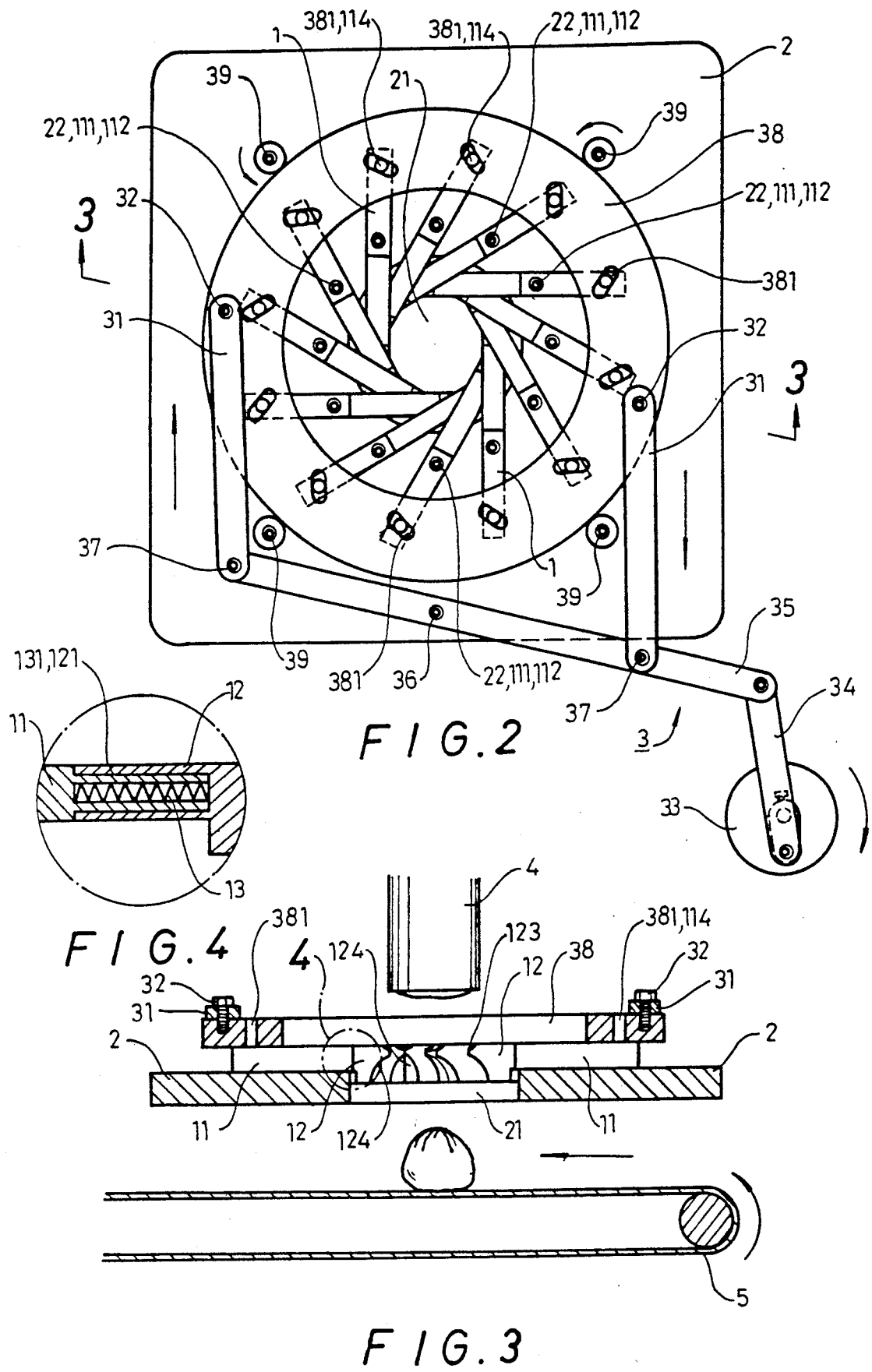
FIG. 2 is a bottom view of the die pieces in a released position.
FIG. 3 is a cross-sectional view taken along line 3—3 of FIG. 2.
FIG. 4 is a magnified view of the part marked 4 on FIG. 3.

As shown in FIG. 2, the cutting and forming device of the present invention comprises a number of die pieces 1, base plate 2, a rotary annular disc 38 and an operating mechanism 3.

Figure 1:
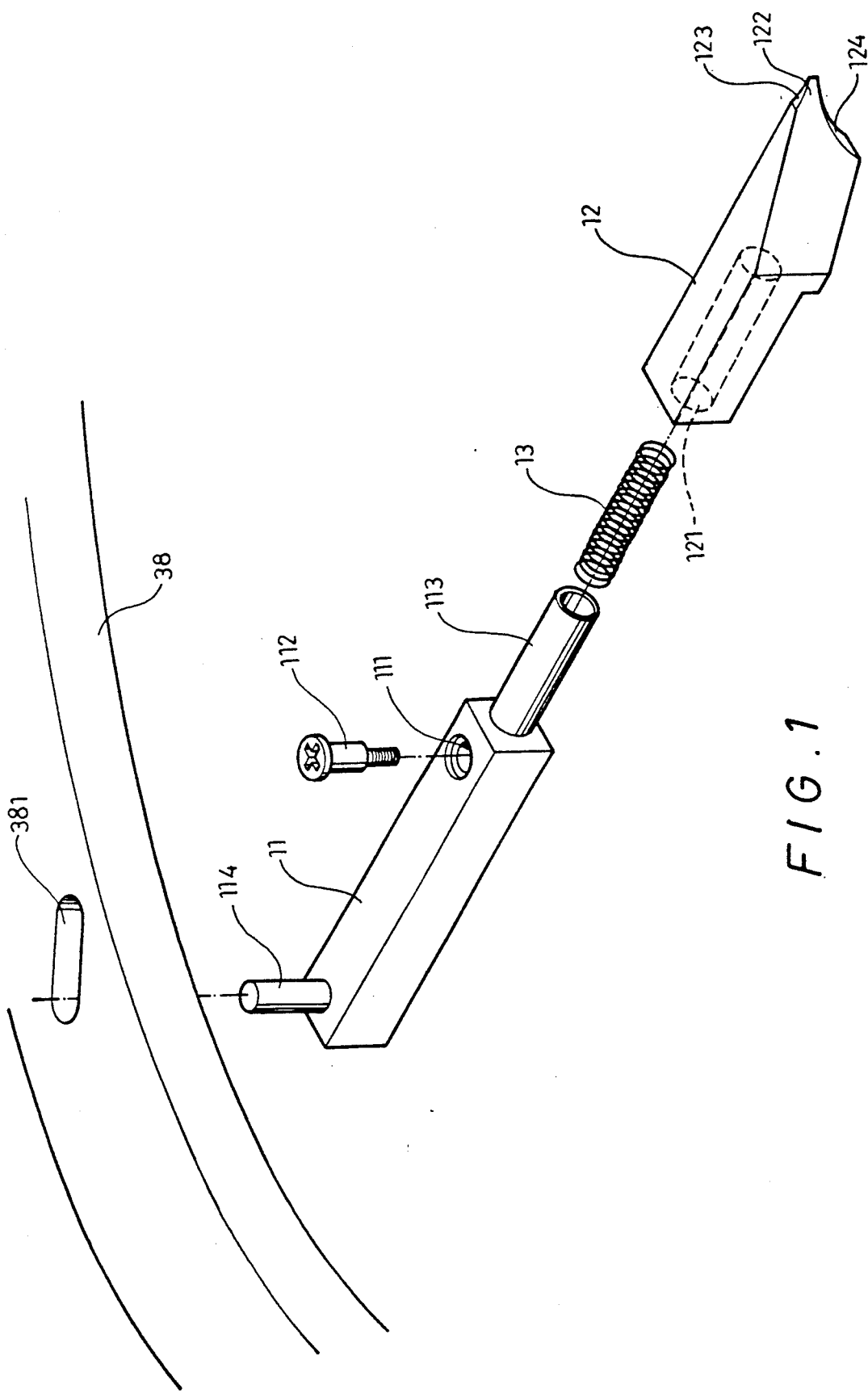
FIG. 1 is an exploded perspective view of the die piece according to a preferred embodiment of the present invention.

As shown in FIG. 1, a die piece 1 provided in the cutting device for an apparatus for making buns has an outer portion 11 and an inner portion 12. The outer portion 11 has a square section and a tubular section 113 of smaller size than the square section and extending inward lengthwise from the inner end of the square section. The square section has a screw hole 112 at the inner end for a screw 112 to pass through to fix the die piece 1 on the base plate 2 and the die piece 1 can move pivot on the screw 112. The tubular section 113 fits in a lengthwise hole 121 in the inner portion 12. In addition, a coiled spring 13 is contained in the inner cavity of the tubular section 113, having one of its ends urging the bottom face of the hole 121 in the inner portion 12 and the other end urging the end face of the square section such that the inner portion 12 can be extended forward or retracted backward relative to the outer portion 11. The outer portion 11 has a protruding post 114 upright at the outer end on the same surface as the screw hole 11. The protruding post 114 fits movably in an elongate hole 381 in a rotary annular disc 38.

The inner portion 12 of the die piece 1 is used for cutting dough and forming it into a bun and is urged forward by the elasticity of the coiled spring 13 contained in the tubular section 113. The inner portion 12 has a pointed cutting tip 122 at its front end, and the cutting tip 122 of each die piece 1 has such a contained angle that the cutting tips 122 of all the die pieces 1 included in this cutting device can constitute 360°, no matter how many die pieces 1 are used. At the upside and the downside of the cutting tip 122 are provided curved faces 123 and 124, and the curved face 124 can form a dough cut into a bun. Just controlling the time for forming a dough into a bun can change the volume of a dough coming down to be cut, and thus to get different sized products. Besides, the bottom of a dough cut can also be formed to close up at the same time.

FIGS. 2 and 3 show a base plate 2, which has a central opening 21 for a tubular dough coming down from a supplying tube 4 to pass through, and a number of screw holes 22 set concentrically with the opening 21 in the same distance between one another for screws 112 to screw therein for fixing the outer portion 11 of each die piece 1 on the lateral surface of the base plate 2. All die pieces can pivot on the screws 112. The cutting tip 122 of the die piece 1 rests against an adjacent die piece 1 such that all of die pieces 1 may form almost a circle with their inner end backs when they are in a released position as shown in FIG. 2. The number of the die pieces is preferably even. The protruding post 114 fits in an elongate hole 381 in the rotary annular disc 38 and the distance between the two ends of the elongate hole 381 and the center of the rotary disc 38 are different such that the protruding post 114 can be moved along the hole 381 when the rotary disc 38 is rotated, usually staying at the spot therein nearest to the center of the rotary annular disc 38 and making all of the cutting tips 122 form almost a circle as shown in FIG. 2.

An operating mechanism 3 includes a fly wheel 33, a connecting rod 34 eccentrically connected with the fly wheel 33 at one end and connected at the other end with a push rod 35, which has a central fulcrum 36 just at the middle and two actional fulcrums 37 at both sides of the fulcrum 36, and one end of two push arms 31, which have their other ends connected with the rotary annular disc 38 by means of pins 32. When the fly wheel 33 is continuously rotated, the push arms 31 move up and down reciprocatingly, rotating the rotary annular disc 38 in a limited angle clockwise and counterclockwise, and moreover, a plurality of position bearings 39 are provided on the base plate 2 around the peripheral edge of the rotary annular disc 38 to urge it to make a stable reciprocating rotation in a limited angle. The disc rotation causes die pieces 1 to move reciprocatingly in a limited angle with the screws 112 as pivots and with the protruding posts 114 fitting in and being moved by the elongate holes 381 in the rotary disc 38. Accordingly, the inner portions 12 of the die pieces 1 smoothly and evenly retract and extend. When the right push arm 31 is pulled downward as shown in FIGS. 2 and 3, the left push arm 31 is pushed upward and the protruding posts 114 stay almost at the middle of the elongate holes 38 forcing all of the cutting tips 122 of the die pieces 1 to extend to form a circle large enough for the tubular dough to pass through downward.

If the right push arm 31 is pushed upward and the left push arm 31 downward as shown in FIGS. 5 and 6, the protruding posts 114 are moved to the farthest spot in the elongate holes 381 from the center of the rotary disc 38, and the cutting tips 122 of all the die pieces 1 are extended to gather at the center of the central opening 21 of the base plate 2 resiliently pushed by the coiled springs 13. Then the tubular dough coming down from the supplying tube 4, and passing through among the die pieces 1 is cut and the piece of the dough cut off by the die pieces is formed into a bun and the end of the dough on the die pieces 1 becomes the bottom of the next bun to be cut. The finished bun automatically drops on the conveying belt 5 when the die pieces 1 are opened.

What is claimed is:

1. The cutting and forming device for an apparatus for making buns comprising:

a rotary annular disc, with a central opening, a dough supply tube above the disc for discharging dough through said opening;

a number of die pieces set under said rotary annular disc, each said die piece comprising an outer portion and an inner portion combined together, said outer portion having a square section and a tubular section and being fixed on a base plate by means of a screw passing through a screw hole bored near the inner end of said square section, said square section having a protruding upright post fitting movably in an elongate hole in said rotary annular disc, said tubular section extending lengthwise from the inner end of the square section to fit in a lengthwise hole in the inner portion, said tubular section having a coiled spring contained in its cavity, said coiled spring having one end urging the end face of the square section and the other end urging the bottom face of the lengthwise hole in the inner portion such that the inner portion is urged forward by the spring, said inner portion having at the front end a pointed cutting tip having a curved face respectively on an upper section and a lower section of the cutting tip;

the base plate having a central opening for the dough to pass through and the same number of screw holes as the die pieces arranged concentrically with said rotary annular disc and equally spaced from each other around the central opening, said screw holes being screwed in by screws to fix the die pieces on the base plate such that each die piece can pivot on the screw and the cutting tips of all the die pieces have such a contained angle that they substantially form a circle when all the die pieces are in a released position and can be moved closely together at the center of the central opening of the base plate when the die pieces are in a cutting and forming position;

an operating mechanism comprising a fly wheel eccentrically connected with one end of a push rod having a central fulcrum and opposite ends connected with respective push arms, each of said push arms having another end connected with the rotary annular disc by means of a pivot such that the rotary annular disc can be reciprocatingly rotated over a limited angle and thus all the die pieces can be moved from the released position to the cutting and forming position by movement of the operating mechanism;

and said die pieces being urged by the coiled springs to have the cutting tip of one die piece resting on an adjacent die piece.

2. The cutting and forming device for an apparatus for making buns as claimed in claim 1, wherein the elongate holes in the disc each have the same distance from the center of said disc, the same angle and the same shape, with one lengthwise end of each hole being nearer to the center of said disc than the other lengthwise end of the hole.

* * * * *